G. WILLIS.
AUTOMOBILE FENDER.
APPLICATION FILED DEC. 21, 1915.
1,188,594.
Patented June 27, 1916.
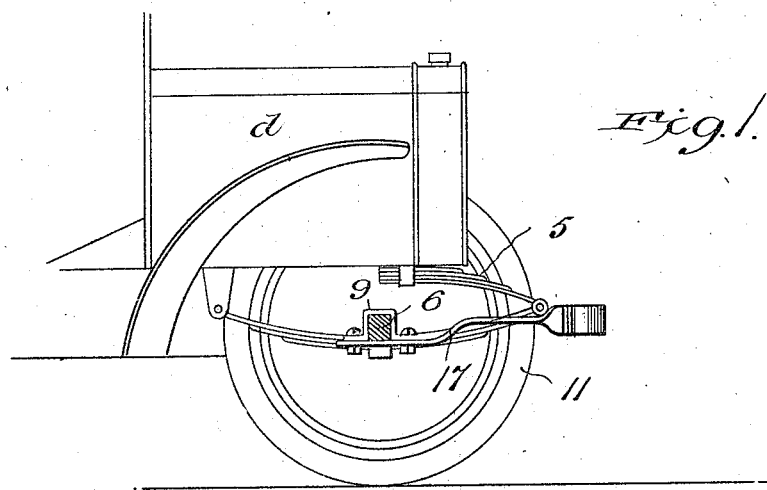
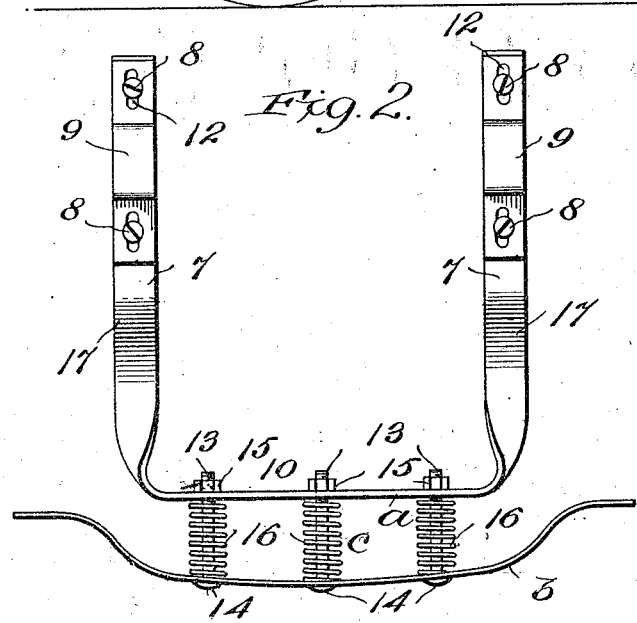
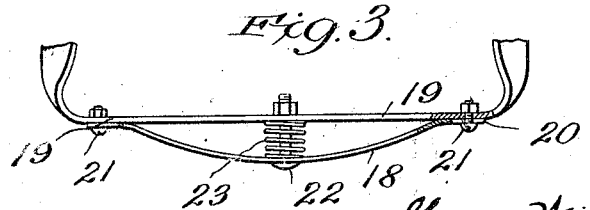
George Willis, Inventor
By his Attorney
John A. Donegan

UNITED STATES PATENT OFFICE.

GEORGE WILLIS, OF BROOKLYN, NEW YORK.

AUTOMOBILE-FENDER.

1,188,594. Specification of Letters Patent. Patented June 27, 1916.

Application filed December 21, 1915. Serial No. 67,963.

*To all whom it may concern:*

Be it known that I, GEORGE WILLIS, a citizen of the United States, residing at Brooklyn, county of Kings, and State of New York, have invented a new and useful Improvement in Automobile-Fenders, of which the following is a specification.

This invention has relation to a bumper for motor vehicles, where it has heretofore been proposed to construct a bumper with a buffer possessing sufficient elastic properties so as to bring about a perceptible yielding of the buffer upon relatively slight impact with an object.

From a standpoint of theory this type of bumper is better than one constructed so as to yield bodily upon impact, because with the former the relatively heavy bumper-frame, which is provided for protecting the vehicles by which it is carried against damage resulting from heavy impact, does not come into direct contact with an object upon colliding therewith so that in instances where impact is relatively slight, as for instance where a car accidently abuts the rear end of a preceding car in coming to a stop at a street crossing the buffer will yield and under the conditions stated will not operate to inflict damage on the preceding car. That this result could not be had with a bodily movable bumper will be obvious upon recalling that these bumpers are not provided with buffers, which for the most part consist of spring pressed U shaped frames formed of sections of relatively rigid material and constructed not for the purpose of overcoming the momentum of the cars to which they are attached upon slight impact with objects, but are constructed solely for the purpose of protecting cars while traveling at a high rate of speed, from being damaged upon moving into contact with other objects. It is a well known fact, however, that bodily yieldable bumpers are more extensively used than bumpers constructed with buffers. This preference is undoubtedly due to the fact that heretofore, in the construction of the latter type of bumper, little or no regard has been given to such important considerations as weight, durability and attractiveness, and, incidentally cost.

Coming now to the present invention, the general object of the same is to provide a bumper of neat and attractive appearance, light in weight and relatively inexpensive to manufacture, and provided with a buffer adapted to yield upon relatively light impact with an object, the bumper as a whole being so constructed as to prevent injury to the car to which it is applied when the same, while traveling at a high rate of speed, moves into contact with an object. And to these ends the invention resides in forming the bumper with a relatively heavy rigid supporting frame, adapted for connection to the front of the axle or to any other suitable portion of the vehicle, and in arranging a relatively thin resilient metallic strip, comprising a buffer, so as to move relatively to the frame upon collision with an object.

Other objects will appear and be better understood from that embodiment of my invention of which the following is a specification, reference being had to the accompanying drawings forming part hereof, in which:

Figure 1, is a side elevation of the device in use. Fig. 2, is a detail plan of the invention. Fig. 3, is a fragmentary plan view of a modified form of the invention.

The bumper of the present invention, comprises a substantially U shaped frame "$a$," a buffer "$b$" and a yielding connection between the frame and the buffer, indicated generally by "$c$." The frame "$a$" is constructed of relatively thick and hard metal and proportioned so as to extend into the space between the front springs, one of which is shown in Fig. 1, and indicated by 5. The frame "$a$" is by preference so constructed that it may readily be applied to the automobile "$d$" without adapting the latter in any manner to accommodate the frame, as for instance, by boring holes in the frame thereof to take bolts or other fastening devices for securing the bumper. For purposes of illustration I have shown the frame "$a$" as being connected to the front axle 6, of the vehicle "$d$." In effecting such connection, the sides 7—7, of the frame "$a$," are arranged underneath the axle 6, and connected by bolts 8—8, or their equivalents, to clevises 9—9, which embrace axle 6, substantially as shown, and thereby support the frame in position. The sides 7—7, are flat and their opposite faces are arranged at right angles to the faces of the cross piece 10, of the frame.

The buffer "$b$" is formed of a strip of relatively thin resilient metal and the distance between the ends thereof corresponds to the distance between the treads of the front wheels, one of which is shown in Fig. 1, and indicated by 11. The buffer is so arranged that its opposite end portions will be disposed in front of the wheels 11, when these are in their normal positions, and by curving the said end portions of the buffer rearwardly and laterally disposes the middle portion thereof, so as to project forwardly. The said middle portion of the buffer "$b$" is arranged for the conventional distance in advance of the wheels 11. By forming slots 12, in the clevises 9—9, or sides 7—7, the frame "$a$" may be adjusted longitudinally of the car "$d$" so that the bumper may be readily adapted to the slight variations found existing between the front axle and ends of different cars.

The connection "$c$" between the buffer and the frame "$a$" is herein shown to consist of a plurality of pins 13—13, which pass through openings made in the cross piece 10, and buffer "$b$". The front ends of the pins are provided with heads and the rear ends may be upset or have connected thereto nuts 15, or other suitable means for securing the pins against detachment. The pins 13—13, pass through helical compression springs 16—16, which operate to yieldingly hold the buffer "$b$" in spaced relation to the cross piece 10, and since the pins 13—13, are slidingly fitted in cross piece 10, buffer "$b$" may move rearwardly against the action of springs 16—16. Upon relatively slight impact of the buffer there will be a perceptible yielding of the springs 16—16. And even on relatively great impact or that sufficient to compress to the limit springs 16—16, the bumper will not act on the object with which it contacts, as if it were a rigid construction because of the ability of the buffer "$b$" to yield when the springs are compressed to their limit or substantially so. Thus it will be seen that when the force of impact is anything less than what is necessary to force the buffer "$b$" substantially into contact with cross piece 10, there will be a gradual rather than an abrupt resistance to the movement of the car "$d$". By forming the buffer "$b$" as shown the same may be highly polished so as to present the attractive appearance desired in a device of this kind. By forming the frame "$a$" as shown it is better adapted than a sectional or a spring pressed structure to resist breakage of the bumper when the same receives a relatively hard blow upon impact with an object. The frame, however, is not constructed so as to remain absolutely rigid when the bumper is forcibly struck, because this would not be desirable under all conditions. Therefore it is proposed that the resistance of the parts to yielding shall progressively increase in the order in which they are arranged after the springs 16—16, have been fully compressed.

As shown in Fig. 2, all the parts are arranged to function as just stated, since there it will be observed that the cross piece 10, of the frame "$a$" has its faces extending vertical with respect to the faces of limbs 7—7, and these latter have offset portions 17—17, between their ends.

In the modified form shown in Fig. 3, buffer 18, is bow-shaped and in its ends which bear on cross piece 19, are slots 20, through which pass pins 21. A pin 22, passes through the central portion of buffer 18, and through cross piece 19, and is surrounded by a spring 23. This structure will function substantially as described in the forms shown in Figs. 1 and 2.

What is claimed as new is:

A bumper for motor vehicles, comprising a substantially U shaped flexible, metal frame formed of a single piece of flat metal, the limbs of said frame having offset portions between their ends and the cross piece having its opposite faces arranged so as to extend in planes at right angles to the planes of the extension of the faces of the limbs, a metallic buffer formed of a single metallic strip of greater flexibility than the frame and means connecting the buffer with the cross piece of the frame, and operating to yieldingly hold the said buffer and the cross piece in spaced relation one to the other.

In testimony whereof, I have signed my name to this specification, in the presence of two subscribing witnesses, this 4th day of December, 1915.

GEORGE WILLIS.

Witnesses:
 JAMES HURLEY,
 CHARLES MURPHY.